June 21, 1960 W. V. HARGREAVES, JR 2,942,105
DEVIATION COMPENSATED SQUELCH CIRCUIT
Filed Dec. 20, 1957
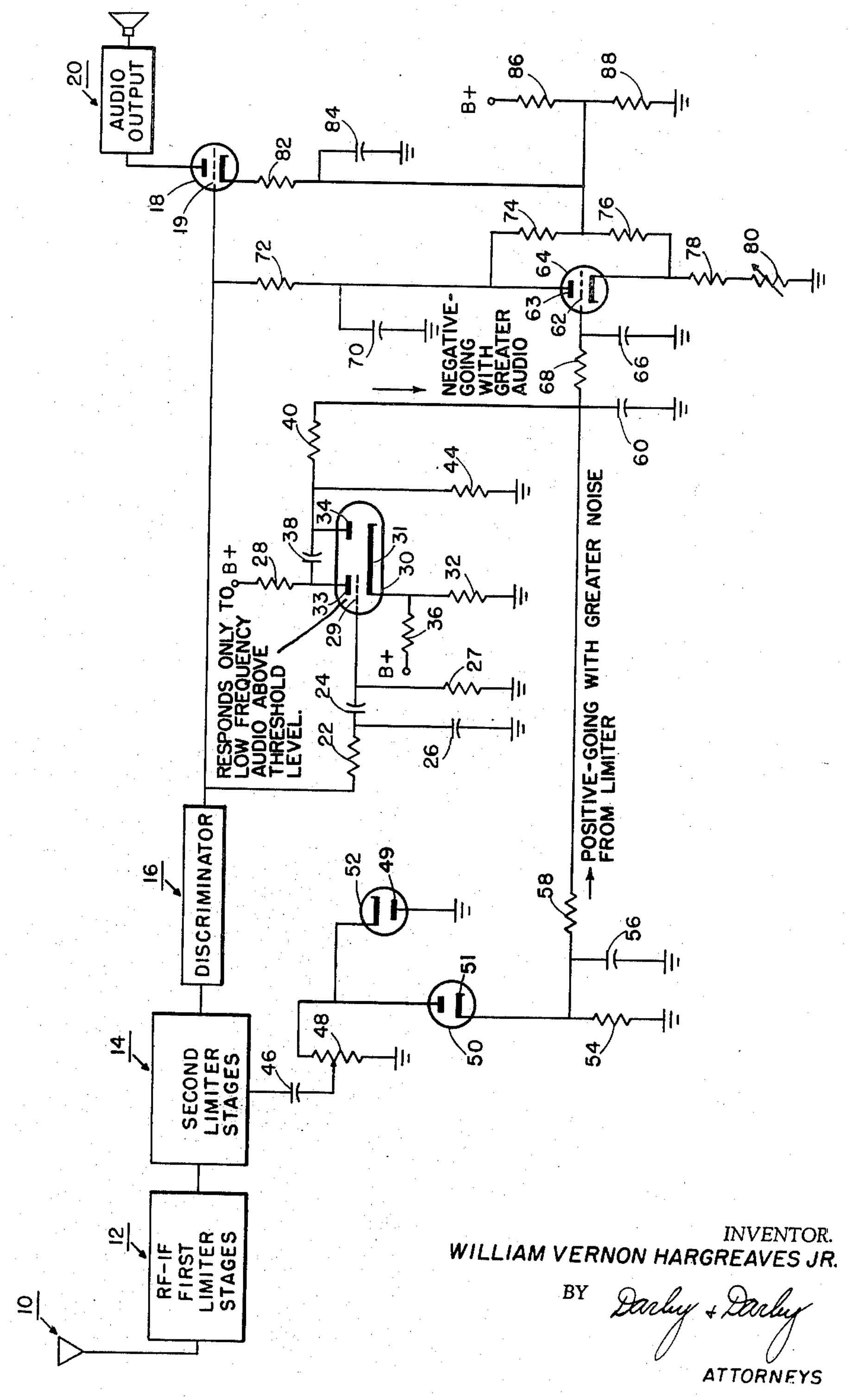
INVENTOR.
WILLIAM VERNON HARGREAVES JR.
BY Darby & Darby
ATTORNEYS United States Patent Office 2,942,105
Patented June 21, 1960

2,942,105

DEVIATION COMPENSATED SQUELCH CIRCUIT

William Vernon Hargreaves, Jr., East Paterson, N.J., assignor to Allen B. Du Mont Laboratories, Inc., Clifton, N.J., a corporation of Delaware Filed Dec. 20, 1957, Ser. No. 704,058

3 Claims. (Cl. 250—20)

This invention relates to squelch circuits and more particularly to an improved deviation compensated squelch circuit.

In my copending application, Serial No. 511,985, now Patent No. 2,878,377, issued March 11, 1959, there is described a mobile communications receiver capable of utilizing frequency modulated radio signals in which there is a squelch circuit for muting the receiver during periods of non-reception and a deviation compensated circuit for unmuting the receiver on reception of a signal. In addition, the deviation compensator circuit prevents the squelch circuit from muting the receiver during periods of deviation in excess of the bandpass of the receiver.

In my prior application, during periods of non-reception, the hiss voltage derived from the screen of the second limiter stage is rectified by the noise diode or rectifier and the resultant positive going voltage is applied to the grid of a squelch control tube rendering the tube conductive and lowering its plate voltage. Since the plate of the squelch control tube is coupled to the grid of the audio tube, lowering the plate voltage of the squelch tube reduces the bias voltage on the grid of the audio tube. With the selection of the proper parameters, the audio tube is thus biased beyond cutoff and rendered non-conductive during periods where no carrier is received and the squelch control tube is conductive.

During periods when a received signal deviates in excess of the receiver's bandpass, a hiss voltage appears that would be rectified and tend to mute the receiver in the manner previously described. However, any recovered audio present is rectified by the deviation compensator to produce a highly negative going signal. This negative going signal is applied to the grid of the squelch tube to override the undesired positive going signal. Thus the recovered rectified audio, in the form of a highly negative going voltage serves to bias the squelch tube below cutoff. Since the squelch control tube is now rendered non-conductive the grid bias of the audio stage becomes highly positive driving the audio stage into conduction and rendering it capable of passing audio signals.

However, it was noted that despite the filtering, a hiss voltage always appeared at the input to the deviation compensator stage despite the fact that the input had been bypassed to ground for the hiss frequencies. This unwanted hiss was rectified by the deviation compensator to produce a negative voltage which bucked the positive voltage applied to the squelch control tube by the noise rectifier. This bucking voltage prevented all of the rectified hiss voltage from appearing on the grid of the squelch control tube and represented a loss of squelch efficiency. Such a condition is highly undesirable in a mobile communications receiver.

Since this noise appears at the input to the deviation compensator, it follows that the stage is in use all the time and as the tube ages and as the parameters of the tube circuit change, the squelch threshold would tend to drift.

The present invention overcomes the above discussed disadvantages by providing an additional stage in series between the deviation compensator and the input thereto. This stage is biased to cutoff during periods of no received signal thereby preventing any hiss frequencies from being rectified by the deviation compensator. However, during periods when a modulated carrier is received, the new stage performs the function of an amplifier for recovered audio. This now means that a much higher recovered audio is presented to the grid of the squelch control tube and a greater deviation may now be tolerated without squelch clipping.

It is therefore one object of this invention to provide a noise rectifier and deviation compensated squelch completely independent of each other and devoid of any interaction.

Still another object of this invention is to provide a mobile receiver having the minimum squelch threshold drift.

A still further object of this invention is to provide a compensation voltage that is far greater than that obtained by straight rectification to permit greater frequency deviation without squelch clipping.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawing, which drawing illustrates in block and schematic form a frequency modulation receiver utilizing the instant invention.

Referring now to the drawing, the incoming signal is picked up on antenna 10 and passes successively through the usual radio frequency amplifier, high and low intermediate frequency amplifiers and a first limiter stage (all designated herein as 12), before being applied as the input to second limiter 14 the output of which is applied as input to discriminator 16. The output of discriminator 16 is applied as the input to first audio stage 18 and then to the audio output stage 20 which consists of the usual deemphasizer network and any other necessary stages of audio amplification. These previously mentioned stages function in a manner well known to those skilled in the art and it is felt that an explanation of their operation is not required for a proper understanding of my invention.

In the instant invention the hiss voltage for rectifier tubes 50 and 52 is obtained from the screen of second limiter stage 14. This hiss voltage, which appears during periods of non-reception (no recovered audio) is applied through condenser 46 and resistor 48 simultaneously to the cathode 49 and plate 51 of diode rectifiers 52 and 50 respectively. As will be seen by those skilled in the art, tubes 50 and 52 function as half wave voltage doublers. The setting of variable resistor 48 determines the amount of hiss rectified by doublers 50 and 52. A positive voltage is developed across resistor 54 and is filtered by the action of condensers 56 and 60 in conjunction with resistor 58 prior to being applied through resistor 68 to grid 62 of squelch tube 64.

Due to the voltage divider network consisting of resistors 74, 76, 78, 80, 86 and 88 the bias on tube 64 is such that a positive going voltage applied to grid 62 drives tube 64 into conduction. Since grid 19 of first audio tube 18 is connected to plate 63 of tube 64 through resistor 72, variations in the voltage at plate 63 will result in similar variations in the bias on grid 19. Therefore as tube 64 is driven into conduction by the action of the rectified hiss voltage, the resultant lowered plate voltage lowers the voltage on grid 19 of tube 18.

Lowering the grid voltage to tube 18, drives this tube into cutoff thereby muting the receiver. Thus, during periods when no carrier is received on the antenna, the presence of the rectified hiss voltage mutes the receiver.

Under conditions of no recovered audio, the combined actions of resistors 36 and 32 biases cathode 31 to render tube 30 cut off. Therefore, the hiss voltage that would previously have appeared at the input to the deviation compensation cannot now be rectified and be applied as a bucking potential to grid 62 of squelch control tube 64.

If now, a modulated signal is received on the antenna, during deviation, recovered audio is present at the output of discriminator 16. This output is fed through the series resistor-capacitor combinations 22, 24 respectively and developed across resistor 27 for application to grid 29 of the triode section of tube 30. Condenser 26 is a bypass for any hiss frequencies that appear during periods of recovered audio. However, during periods when the recovered audio is even slightly above the bias level, the signal on the triode section of tube 30 will cause the tube to conduct on positive peaks. In fact, the greater the deviation, the greater the peaks resulting in greater amplification. The recovered audio that has been applied to grid 29, and amplified by tube 30 is then applied through condenser 38 to shunt diode plate 34 of the diode section of tube 30. The shunt diode section and the triode section of tube 30 combine to produce an amplified negative D.C. across resistor 44 which is filtered by the combined action of resistor 40 and condenser 60 and is applied through resistor 68 to grid 62 of tube 64.

When the amplified negative D.C. developed across resistor 44 is applied to grid 62, tube 64 becomes cut off and the voltage at plate 63 rises. When the voltage at plate 63 rises, the voltage applied to grid 19 tends to rise thereby maintaining tube 18 conductive. Thus, during intervals of deviation in excess of the pass band of the receiver (a condition which would normally mute the receiver during such excursions), compensation is obtained as the voltage at plate 63 rises due to the squelch action just described. The end result is a highly efficient squelch circuit that will accept, without squelch clipping, voice frequencies of at least twice the rated sensitivity, that are deviating up to twice the rated 6 db. band width of the receiver despite the fact that squelch control 80 is set at the least sensitive point.

My novel device has been described in terms of a single dual section tube, one section of which is a triode and the other section a diode, both sections having a common cathode. While this embodiment is preferred for practical and space-saving reasons, it is obvious that the same results may be obtained by the use of a single triode and a single diode having their cathodes connected together and biased by means of resistors 36 and 32.

While I have described what is presently considered a preferred embodiment of my invention, it will be obvious to those skilled in the art that various changes and modifications may be made therein without departing from the inventive concept, and it is aimed in the appended claims to cover all such changes and modifications as fall within the true spirit and scope of my invention.

What is claimed is:

1. A squelch control circuit for frequency modulated radio receivers comprising, in combination, an audio frequency amplifier tube having a control electrode; a hiss rectifier, means for applying a hiss frequency voltage to said rectifier, a load resistor, a second hiss rectifier connected in shunt across said first rectifier and oppositely poled whereby the voltage developed across said load resistor is effectively doubled, means for applying a hiss frequency voltage to said second rectifier, an electron tube having cathode, anode and control electrodes, a resistance capacitance network connected to the output of said hiss rectifiers, means for applying the rectified voltage from said hiss rectifiers to said resistance capacitance network, means for applying the average voltage present across said resistance capacitance network to the control electrode of said electron tube, a voltage divider network connected to said electron tube for determining the voltage applied to said electron tube cathode, and means for applying voltage variations appearing in the output of said electron tube to said control electrode of said audio frequency amplifier tube of the radio receiver to thereby bias said amplifier tube beyond cutoff when said average hiss voltage exceeds a predetermined negative value as determined by said voltage divider network.

2. A squelch control circuit for frequency modulated radio receivers comprising, in combination, a hiss rectifier, means for applying hiss frequency voltage derived from the signal channel ahead of the audio amplifier tube of the receiver to said rectifier; an electron tube having cathode, anode and control electrodes, means for applying the rectified output from said hiss rectifier to the control electrode of said electron tube; a second rectifier, means for supplying an audio frequency voltage derived from said signal channel of the receiver ahead of the audio amplifier tube to said second rectifier, a hiss filter network, a second audio amplifier, said hiss filter being connected to said second audio amplifier to reduce any hiss voltage present in said audio frequency voltage, the output of said second audio amplifier being connected to said second rectifier, means for supplying the rectified voltage from said second rectifier to the control electrode circuit of said electron tube in opposition to the voltage from said first rectifier, a voltage divider network including an adjustable resistor for determining the voltage applied to the cathode of said electron tube, and means for applying the output of said electron tube to the control electrode of said first mentioned audio amplifier tube to bias said amplifier tube to cutoff when the net negative voltage of said electron tube grid with respect to its cathode exceeds the predetermined value as determined by the setting of said adjustable resistor whereby said rectified hiss voltage tends to mute said receiver and said audio voltage tends to awaken said receiver.

3. A squelch control circuit for frequency modulated radio receivers comprising, in combination, an audio frequency amplifier tube having a control electrode; a hiss rectifier, means for applying a hiss frequency voltage to said rectifier; a load resistor, a second hiss rectifier connected in shunt across said first rectifier and oppositely poled whereby the voltage developed across said load resistor is effectively doubled, means for applying a hiss frequency voltage derived from the signal channel ahead of the audio amplifier tube of the receiver to said rectifier, an electron tube having cathode, anode and control electrodes, means for applying the rectified output from said hiss rectifier to the control electrode of said electron tube, a third rectifier, means for supplying an audio frequency voltage derived from said signal channel of the receiver ahead of the audio amplifier to said third rectifier, a hiss filter network, a second audio amplifier, said hiss filter being connected to said second audio amplifier to reduce any hiss voltage present in said audio frequency voltage, the output of said second audio amplifier being connected to said third rectifier, means for supplying the rectified voltage from said third rectifier to the control electrode circuit of said electron tube in opposition to the voltage from said first rectifier, a voltage divider network including an adjustable resistor for determining the voltage applied to the cathode of said electron tube, and means for applying the output of said electron tube to said control electrode of said audio amplifier tube to bias said amplifier tube to cutoff when the net negative voltage of said electron tube grid with respect to its cathode exceeds a predetermined value as determined by the setting of said adjustable resistor whereby said rectified hiss voltage tends to mute said receiver and said audio voltage tends to awaken said receiver.

References Cited in the file of this patent

UNITED STATES PATENTS

| | | |
|---|---|---|
| 2,247,085 | Goldman | June 24, 1941 |
| 2,343,115 | Noble | Feb. 29, 1944 |
| 2,372,934 | Campbell | Apr. 3, 1945 |
| 2,400,948 | Peterson | May 28, 1946 |
| 2,420,518 | Brown | May 13, 1947 |
| 2,803,701 | Clark et al. | Aug. 20, 1957 |
| 2,878,377 | Hargreaves | Mar. 17, 1959 |